Sept. 26, 1933.  P. I. SCHULTZ  1,928,465
VEHICLE LIFT
Filed Dec. 5, 1930   2 Sheets-Sheet 2
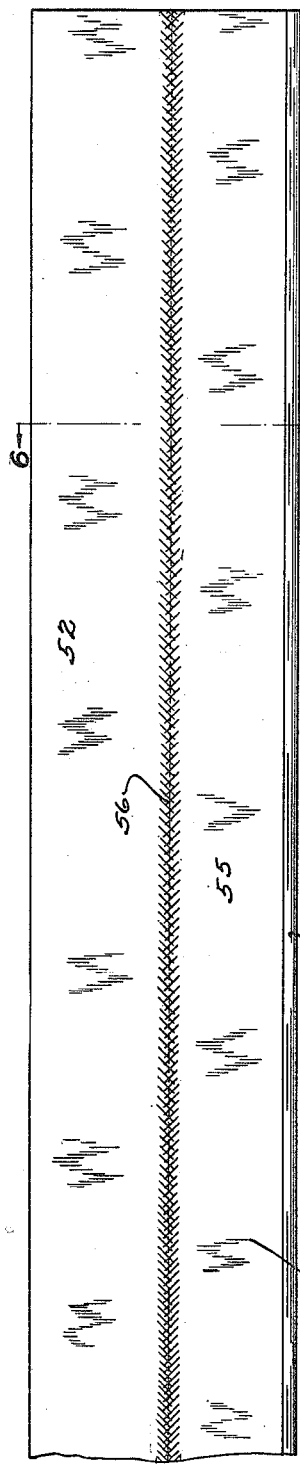
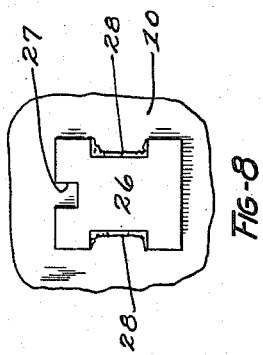
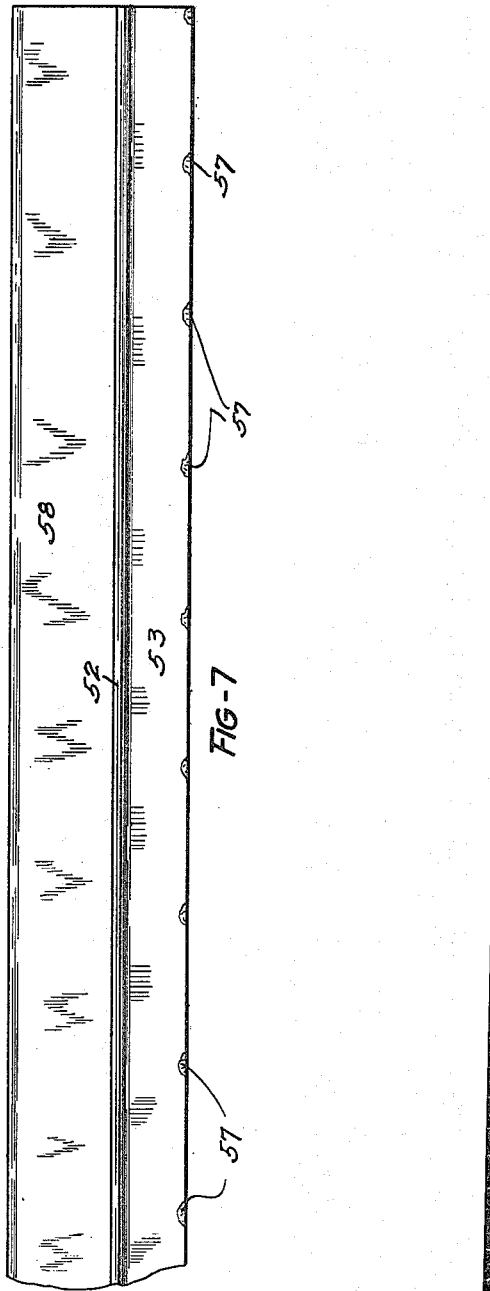
INVENTOR:
Paul J. Schultz
BY Bates, Goldrick & Teare
ATTORNEYS Patented Sept. 26, 1933

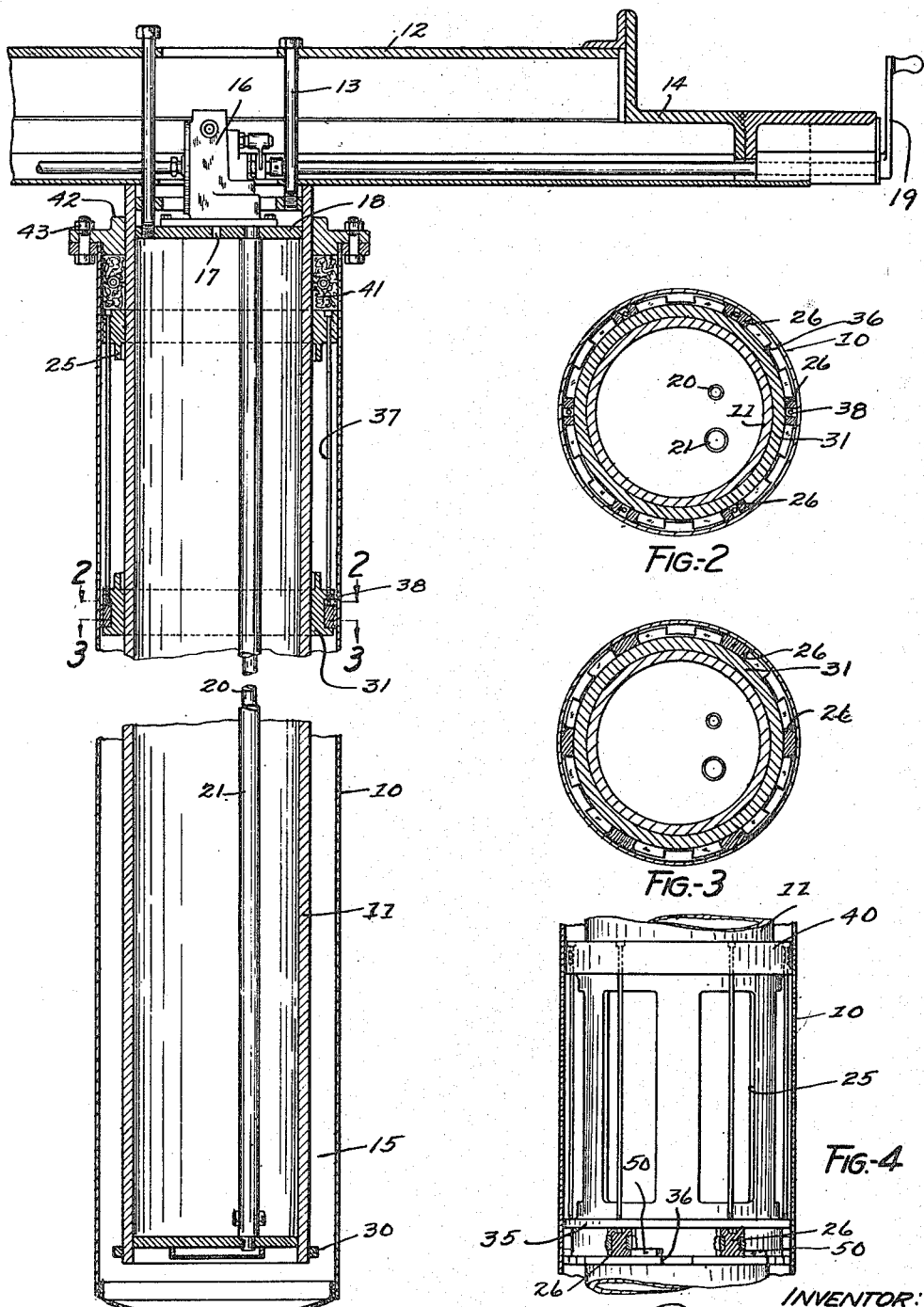

1,928,465

UNITED STATES PATENT OFFICE 1,928,465

VEHICLE LIFT

Paul I. Schultz, Cleveland, Ohio, assignor to The United States Air Compressor Company, Cleveland, Ohio, a corporation of Ohio Application December 5, 1930. Serial No. 500,291

7 Claims. (Cl. 254—93)

This invention relates to power actuated lifts that are used for elevating a motor vehicle for greasing, oiling and repairing, and particularly to lifts of the fluid actuated and rotating type. Considerable difficulty has been experienced in obtaining a satisfactory bearing for the plunger of such lifts when the lift is in the elevated position for any uneven loading tends to affect the vertical alignment between the plunger and casing. This in turn increases the difficulty of maintaining a fluid-tight joint between the plunger and casing.

To assist in maintaining the desired alignment, the practice has been for manufacturers to utilize two plunger bearings, one of which is disposed adjacent the end of the casing, and the other of which is disposed within the casing and approximately two feet below the upper end thereof. One form of such bearing construction embodies a cylindrical sleeve that extends into the casing and is attached thereto only by an exterior flange, which in turn is connected to a corresponding flange on the end of the casing. The lower end of the sleeve is loosely positioned within the casing for the outer surface of the sleeve and the adjacent inner surface of the casing are unfinished surfaces. It soon developed however, that when the lift was unevenly unloaded, the plunger had a tendency to weave until the loose play was taken up between the sleeve and the casing. Such weaving caused leakage through the gasket, which was disposed between the flanges. In addition, all impact stresses incident to the abrupt stopping of the plunger at the limit of its upward movement, were transmitted through the bearing sleeve to the bolts that held the flanges together To overcome such operating difficulties, provision was made for a rigid inner bearing by welding a bearing ring onto the casing. Another ring known as the outer bearing member was also fastened in a similar manner to the casing near the top thereof, and packing material was then disposed on the top edge of the upper ring, and provision was made for adjusting the ring packing by a follower plate. This construction was very satisfactory, insofar as the elimination of a flange gasket and assuring vertical alignment of the plunger was concerned, but it was objectionable in that the plunger could not be removed from the upper end of the casing, for the plunger stop would engage the inner bearing ring or its associated support. Consequently, the plunger could not be replaced, without removing the entire casing from the ground, and removing the casing head and withdrawing the plunger from the bottom end of the casing. As the head is usually welded onto the casing, it is readily apparent that this method of bearing construction is not entirely satisfactory.

A further operating difficulty which has been experienced in connection with the construction of a satisfactory lift has been the tendency of the lift to twist if the vehicle is rolled slightly while the lift is elevated. It is frequently necessary to move a vehicle at such time in order to make the fittings more accessible on certain parts of the car. This tendency to twist is largely due to the fact that the trackways have been made of channel members, which are unsupported except at the transverse middle portion thereof by the plunger head. The twisting strain places undue stresses upon the plunger head and also tends to deform the trackways.

One of the objects of my invention therefore, is to provide a bearing construction for a plunger actuated lift, that will assure accurate vertical alignment of the plunger and casing, notwithstanding the fact that the lift may be unevenly loaded, and will permit the removal of the plunger from the top of the casing without requiring the casing to be withdrawn from the ground.

Another object is to utilize a bearing construction, which while rigid, will eliminate the necessity for the use of a packing gasket and will enable a fluid tight joint to be maintained between the plunger and casing by the use of the ring packing that may be effectively adjusted and held in position by a small number of relatively light bolts.

An additional object of my invention is to fabricate the trackways so as to obtain a rigid structure in an economic manner and still support the load effectively without placing undue lateral stresses upon the plunger head.

The preferred means for carrying out my invention is shown in the drawings, wherein Fig. 1 is a vertical transverse section through a vehicle lift embodying my invention; Figs. 2 and 3 are transverse sections taken on correspondingly numbered lines in Fig. 1; Fig. 4 is a vertical section taken through the lift showing the inner bearing member in elevation; Fig. 5 is a top plan view of part of a vehicle trackway embodying my invention; Fig. 6 is a transverse section through the trackway on the line 6—6 of Fig. 5; Fig. 7 is a side elevation of the trackway shown in Fig. 5, and Fig. 8 is a view looking toward one of the inner bearing supports, and showing it attached to the inner surface of the casing.

My invention is shown in connection with a fluid operated lift wherein 10 designates a casing, which is adapted to be imbedded in the ground, while 11 indicates a plunger which is mounted for reciprocation therein. A head 12 is fastened by securing members 13 to the top of the plunger and carries a vehicle trackway 14 at each end thereof. The lift is designated as a full-hydraulic type in that a liquid fills the space 15 between the plunger and casing and also partially fills the plunger. Such liquid is caused to flow between the plunger and the space 15 by air under pressure which is admitted to the plunger through a valve mechanism indicated in general at 16, and through a passageway 17 in the closure plate 18 adjacent the top of the plunger. The valve may be controlled by means of a handle 19, which is shown adjacent the side of the trackway. When air under pressure is admitted at the top of the plunger, it forces the liquid up the pipe 20 through the valve chamber and thence down pipe 21 and into the space 15. The details of such valve mechanism are not part of the present invention but the general arrangement has been indicated to show the method of operation of the lift.

To support the plunger while it is in elevated position, and at the same time to permit withdrawal of the plunger from the top of the casing, I utilize an inner bearing member, which is in the nature of a sleeve 25 that extends into the casing and is insertable from the top thereof. The sleeve is adapted to be vertically positioned by a bayonet lock against blocks 26, which are rigidly fastened to the interior of the casing, as by a welding operation. The shape of each block is preferably that shown in Fig. 8 wherein a recess or slot 27 is disposed adjacent the upper midportion thereof while other recesses 28 are disposed at the side portion thereof. The recess 27 serves to lock the sleeve in position, as will be hereinafter set forth while the recesses 28 provide adequate space for the welding material and yet confine it so as to prevent it from flowing over the top, side or bottom edges of the block. It is quite important that all of the edges be kept free of the welding material, as such edges are utilized for guiding the sleeve as it is turned and locked into position. These blocks may be welded into place within the casing through the open end thereof, and in the spaced relationship shown in Figs. 2 and 3.

To limit upward movement of the lift, I have shown a shoulder 30, which may comprise a ring that is welded onto to the outer surface of the plunger and adjacent the lower end thereof. Such ring is adapted to engage the bottom edge 31 of the bearing sleeve, and is sufficiently narrow to clear the blocks when the sleeve is withdrawn to permit removal of the plunger from the casing.

To insert and hold the bearing sleeve in place, I have shown the lower end of the sleeve, as having an annular groove 35, and as having spaced passageways 36, which extended downwardly from the groove to the bottom of the sleeve. These passageways are spaced in accordance with the spacing of the blocks and are slightly wider than the blocks so as to permit them to enter the groove when the sleeve is inserted within the casing. Furthermore, the depth of the groove in a longitudinal direction is slightly larger than the length of the blocks so that as the sleeve is rotated, the blocks enter the groove and are disposed between the passageways 36. In effect, therefore, the blocks and groove coact to provide a bayonet lock between the sleeve and casing. A positioning block 50 preferably on the sleeve limits the degree of sleeve rotation with reference to the blocks.

To lock the sleeve against rotation, I have shown threaded members 37 which extend downwardly from the top of the sleeve through threaded passageways 38 at the bottom of the sleeve. The end of the members 37 are adapted to enter the slots 27 in the top of the respective blocks and when they are drawn tightly into position, they lift the sleeve so as to bring the bottom of the groove against the bottom of the blocks. They thereby take up the slack between the blocks and sleeve so that when the ring 30 engages the sleeve, the impact forces are transmitted directly through the sleeve and blocks to the casing.

To make a fluid tight joint between the casing and plunger, I make the top edge of the sleeve terminate short of the top of the casing and utilize the space therebetween for packing material 41. A follower plate 42 may then be adjustably attached to the casing by securing members 43. The follower serves as an outer bearing for the plunger and coacts with the inner bearing to eliminate the necessity for the packing to withstand lateral stresses. To assure this, a slight clearance, which is imperceptible on the scale at which the lift is shown, is provided between the plunger and the upper end of the sleeve, while the lower end only of the sleeve has bearing contact with the plunger. This leaves the packing free to be used only for stopping leakage and hence, materially increases the life thereof.

To withdraw the plunger from the casing, the trackways and head are removed from the plunger, the follower plate and packing is removed and then the securing members 37 are withdrawn from engagement with the blocks 26. Thereupon the sleeve may be turned until the positioning block 50 strikes the adjacent block 26 at which time, the blocks will be in registration with the apertures 36 and the sleeve can be withdrawn with the plunger when the shoulder 30 engages the bottom edge of the sleeve.

To provide a rigid and serviceable trackway that may be economically made, I prefer to fabricate it from a Z bar 51 and an angle bar 52. One leg 53 of the angle bar is positioned in contiguous relationship to one of the legs 54 of the Z bar, as is shown in 56. This brings the top surface of the other leg of the angle bar in the same plane as the top surface of the 55 of the Z bar. The two bars are then connected together preferably by seam welding, as at 56 throughout the entire length thereof. Thus, the upper surface of the trackway is substantially a plane surface while the downwardly extending adjacent legs of the coacting bars provide a reinforcement at the point where the greatest load is apt to occur on the trackway. The bottom edges of the legs 53 and 54 may then be welded together at spaced intervals, as is shown at 57 in Fig. 7.

A trackway made in accordance with my method possesses great strength, lightness in weight, and resistance to flexure if the lift should be unevenly loaded. Furthermore, the inner member being a Z bar provides a wheel guide 58, and a convenient means for enabling the plunger head to be attached thereto.

I claim:

1. In a lifting device, the combination with a casing, of a plunger mounted for reciprocation therein, a removable bearing sleeve disposed between the plunger and casing, and entirely within the casing, means adjacent the lower end of the sleeve for locking it against longitudinal movement with reference to the casing packing means engaging the casing and plunger and also the top of the bearing sleeve, and a packing follower adjustably connected to the casing, adjacent the end thereof.

2. In a lifting device, the combination with a casing, of a plunger mounted for reciprocation therein, spaced bearing members adjacent the intermediate and end portions of the casing, the inner bearing member having a bayonet lock connection with the casing, packing means between the casing and plunger and also between the members, the outer member acting on said packing means for adjusting it in position, and the other of said members acting on the plunger to limit outward movement thereof.

3. In a lifting device, the combination with a casing, of a plunger mounted for reciprocation therein, a plurality of spaced shoulders within and upon said casing, a plunger bearing sleeve having a bayonet lock connection with the shoulders, a limiting stop on the plunger, said stop being adapted to engage the bearing sleeve and thereby to limit movement of the plunger when the sleeve is locked to the shoulders, and said stop being adapted to clear the shoulders when the sleeve is disengaged from the shoulders, whereby the sleeve and plunger may be withdrawn from the same end of the casing.

4. In a lifting device, the combination with a casing, of a plunger mounted for reciprocation therein, a bearing member between the casing and plunger and adjacent the outer end thereof, packing means between the casing and plunger and engaged by the bearing member, and a second bearing member removably positioned between the casing and plunger and intermediate the ends of the casing, shoulders on the casing engaging the inner bearing member for positioning it with reference to the casing, and means positioned within the casing and adjustable through the end thereof for locking the inner bearing member and shoulders together, whereby the bearing member is prevented from rotating with reference to the casing.

5. In a vehicle lift, the combination with a casing, of a plunger mounted for reciprocation therein, a bearing member disposed within the casing, and means for interlocking the lower end of the member and the casing, whereby the bearing may be withdrawn from the casing while the plunger is positioned therein.

6. A vehicle lift, comprising in combination, a casing adapted to be embedded within the ground, a plunger mounted for reciprocation therein, a member rigidly fastened to the casing on the inner wall thereof and intermediate the ends thereof, a bearing having an interlocking connection with said member, and providing a lower bearing for the plunger, said bearing having a vertical extension terminating in a packing seat, a packing follower removably attached to the casing, and providing an outer bearing for the plunger, the lower bearing acting, as a stop to limit upward travel of the plunger, and also acting to transmit the force incident to the stopping directly to the wall of the casing through said member.

7. In a lifting device the combination with a casing, of a plunger reciprocable therein, a member rigidly fastened to the casing intermediate the ends thereof, an inner bearing for the plunger removably attached to the member, an interlocking connection between the member and bearing, said connection being operative upon rotation of the bearing in one direction to lock the bearing to the member and to prevent withdrawal of the plunger from the casing, and being operative upon rotation of the bearing in the opposite direction to release it and to free the plunger for withdrawal thereof from the upper end of the casing.

PAUL I. SCHULTZ.